March 24, 1953     B. GARFINKEL     2,632,190
DYNAMICALLY AND AERODYNAMICALLY STABLE SUSPENSION BRIDGE
Filed Sept. 26, 1946

INVENTOR
Benjamin Garfinkel
BY
Louis Shumacher
ATTORNEY

Patented Mar. 24, 1953

2,632,190

UNITED STATES PATENT OFFICE 2,632,190

DYNAMICALLY AND AERODYNAMICALLY STABLE SUSPENSION BRIDGE

Benjamin Garfinkel, Brooklyn, N. Y.

Application September 26, 1946, Serial No. 699,515

3 Claims. (Cl. 14—18)

This invention relates to improvements for the elimination of undulations in flexible-frame suspension bridges susceptible to annoying or dangerous oscillations initiated by wind pressure.

The term "flexible-frame, oscillator suspension bridges" is used herein to refer to or to designate bridges wherein the main span has a width so small or a stiffening truss or girder so shallow, or both, in relation to the length of the main span, that the latter is subject to undulations which can be produced only by forces greatly in excess of the relatively moderate wind pressures which initiate the undulations, and such bridges are indicated in character in that a moderate wind can give rise to dynamic conditions in the bridges causing vertical oscillations greatly in excess of what may be caused by wind uplift pressure alone. Such a bridge may be further defined in that it has a width so narrow in relation to the length of the main span that the latter is primarily dependent for its lateral rigidity on the lateral restraining effect of the cables rather than on the inherent stiffness of the roadway itself. A suspension bridge of this type is the one that failed at Tacoma in the State of Washington.

One subject of the invention is to provide improvements for a flexible-frame suspension bridge above referred to whereby the latter shall undulate vertically only in accordance with the actual uplift forces generated by wind pressure, the bridge being thus relatively free of internal dynamic changes or conditions initiated by sudden impacts of winds of low velocity or by periodic winds, the bridge thus becoming quite stable at low wind velocity and better able to resist the impact of winds of very high velocity.

I have discovered that in a bridge having the objectionable vertical oscillations mentioned, these oscillations generally create increased lift forces and may cause aerodynamic instability; in this manner, the large undulations created by dynamic changes in the bridge can be considerably aggravated.

It is therefore another object of the invention to furnish improvements for a flexible-frame bridge whereby unduly increased lift and/or aerodynamic instability are avoided or substantially reduced.

In a flexible-frame suspension bridge, I have also discovered that a lateral wind creates a transverse oscillatory motion in both the roadway and cables, with the oscillation of the roadway being out of phase with that of the cable. Torsional effects initiated by a sudden guest of wind or variation in traffic load also induce lateral oscillatory motions. Complex dynamic forces are created by the lateral motions involved in a manner analogous to the forces created by the harmonic motions of a pair of springs, with the cables swinging like a hammock from the tower supports while the roadway swings similarly from the cables. The lateral displacement between the roadway and cables may be accentuated by a sudden gust of wind. As a result of this differential lateral displacement, transverse forces are created between the cables and roadway. These transverse forces induce vertical reactions in the cables and roadway. It is these induced vertical reactions which in my opinion are primarily reponsible for the unusual vertical undulations experienced in these bridges.

It is therefore more particularly an object of the invention to provide improved means for reducing differential lateral oscillations of roadway and cables and to substantially reduce the creation of vertical reactions from the lateral forces set up by such lateral oscillations.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Figure 1:
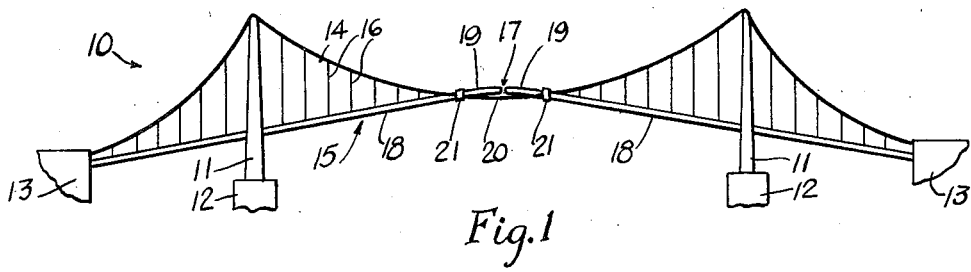
Figure 1 is a diagrammatic view in side elevation showing a bridge embodying the invention.

The advantages of the invention as here outlined are best realized when all of its features and instrumentalities are combined, but useful embodiments may be produced involving less than the whole.

Generally described, the invention includes a tie between the suspended roadway and its supporting cables, which tie forms a connection which is always rigid horizontally, transversely of the main span, and which may also be rigid longitudinally and/or vertically, preferably but not necessarily in combination with a transversely split roadway affording roadway sections maintained in register or alinement with each other desirably, for example, by a so-called pin joint or by a suitable bracing, but otherwise free for relative movement sufficient to avoid transmission therebetween of torsional or horizontal moments of force; the roadway may comprise a plurality of such splits forming several roadway sections thus interrelated with each other and with the cables; and the rigid ties referred to are located at or adjacent to the splits or breaks, bearing in mind that in a very long span, the tie and roadway split may be considerably spaced and yet be operatively near each other. Functionally, the tie reduces displacement as between the roadway and the cables laterally thereof, while the split roadway eliminates internal vertical reactions due to torsional and horizontal moments of force, created by the residual lateral oscillations, which occur because the rigid tie can be located advantageously only in the central region of the span, and these functions produce an unusual conjoint result. Certain of the advantages of the roadway split as herein described may be realized without employing the rigid ties mentioned.

Referring in detail to the drawing, 10 denotes a bridge embodying the invention, comprising a roadway 15 and its stiffening girder or truss shown at 22, which is of any suitable construction well known in the art except as hereinafter described, the same being hung by a multiplicity of suspenders 16 from two or more cables 14, that are carried by towers 11, 12, and anchored at 13 in a manner well known in the art.

The roadway 15 which provides the main span is transversely split or broken at one or more points intermediate of the towers and preferably adjacent to the central region of the main span, desirably at a point or points where the cables 14 are in relative proximity to the roadway. It is sufficient for the purposes of this invention to indicate a single split of the latter as at 17. While certain advantages of the invention may be obtained hereinbefore indicated by using a level roadway, the invention is best exemplified by using a cambered roadway, and in accordance with this invention the split at 17 provides a plurality of roadway sections 18 which are inclined along relatively straight lines as shown. To avoid an undue peak in the roadway, the sections 18 may have slightly curved portions 19 at the center of the roadway, but these are so relatively minor as compared to the length of the span, that the sections 18 may be considered to be straight. At the central region of the roadway the cables dip down to the level of the roadway and preferably below the same as shown at 20. Where the cables 14 intersect the roadway they are connected to the latter by ties, brackets or other suitable connecting means 21 which are unlike suspenders 16 in that they furnish lateral rigidity, and may also be longitudinally rigid if desired. Such ties 21 are provided for each of the cables 14. If desired, only one of the ties 21 may be used for each cable and interconnecting means provided between the roadway sections 18 to maintain them in alinement with each other, but without permitting the transmission of moments of force so that the effectiveness of the split 17 is not impaired.

Figure 3:
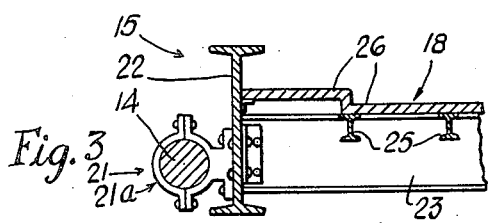
Fig. 3 is an enlarged fragmentary transverse sectional view of certain details of the invention according to Figure 1.

Referring now to Fig. 3, the roadway 15 comprises a stiffening girder or truss 22 at each side thereof, carrying the transverse beams 23 and carrying longitudinal I-beams 25 forming a rigid frame section on which is supported the roadway surface portion 26. Directly rigidly affixed to the girders 22 is a rigid bracket structure 21a above indicated at 21, and this bracket structure may be made like a clamp so tightly affixed to its cable 14, as to prevent any relative lateral movement with or without restraint against relative longitudinal and/or vertical movement.

Figure 4:
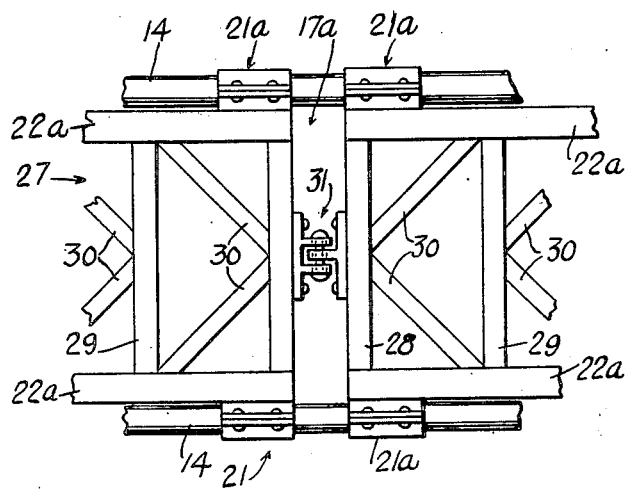
Fig. 4 is a fragmentary plan view of a slightly modified form with parts removed showing certain structural details according to the invention and as indicated in Figure 1.

In Fig. 4 is shown a slightly modified roadway 27 comprising the girders 22a, like those at 22 with a cross-bracing including the beams 28, 29 and the bracing 30. The ties or clamps such as 21a are directly rigidly secured to the girders as indicated in Fig. 3 and the split between the roadway sections is indicated at 17a. Interconnecting the roadway sections is a so-called hinge means or pin joint 31 or the like well known in the art and hence requires no further description, this pin joint being intended to exemplify any type of joint or interengaging structure which serves only to maintain the bridge sections such as 18 in approximate alinement with each other, but which will not transmit any moments of force between these bridge sections.

It will be noted that if a pin joint 31 or analogous device is used, ties such as 21 and 21a may be omitted at one side of the split in the roadway; in other words such ties would be used at only one side of the split. However, the pin joint may be omitted entirely and ties such as 21 or 21a used at both sides of the split 17 or 17a, in which case the cables themselves will serve to maintain the bridge sections in alinement with each other. If desired, the pin joint may be used in combination with ties on both sides of the split in the roadway. It is a feature of the invention that the split roadway provides straight roadway sections maintained in approximate or operative alinement with each other but being incapable of transmitting moments of force therebetween, are rigidly connected to the suspension cables at or adjacent to the split. Since the span is of great length, a substantial distance may intervene between the cable tie 21 and the split, and these two points may nevertheless be regarded as adjacent to each other, provided only that their proximity is such as to produce an operative interrelation.

Figure 2:
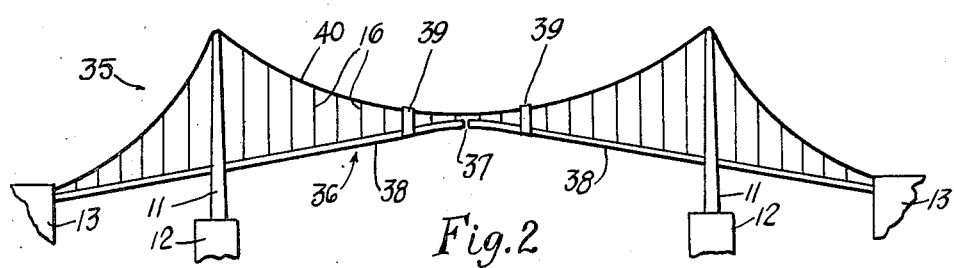
Fig. 2 is a similar view of a modification.
Figure 5:
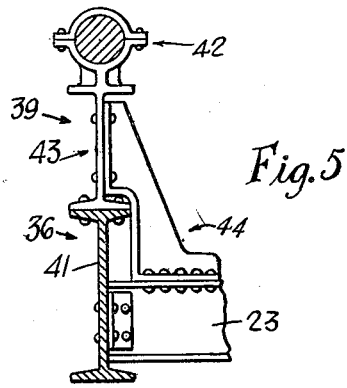
Fig. 5 is a view like that of Fig. 3 illustrating the details of the invention indicated by the bridge of Fig. 2.

In Fig. 2 is shown a bridge 35 embodying the invention, the same being in all respects like the bridge 10 except that the cables 14 are above the roadway at all points, the ties 21 being modified accordingly. More particularly, the roadway 36 is discontinuous at one or more points 37 to provide a plurality of roadway sections 38 having ties 39 rigidly connecting the roadway to the cables 40. The roadway may include the girders 41 like those at 22, and the ties 39 may comprise clamps 42 and cooperating rigid, structural means 43 of any suitable character such as stiffener brackets 43 and 44. Thus each of the cables 40 secured to the roadway in a rigid manner against relative movement. It will be appreciated that the specific structural means shown in Figs. 5 and 3 are merely illustrative of rigid tie means. The functional operative relationships involved are the same for Fig. 5 as above described for Fig. 3. One reason for the showing of the structure of Fig. 2 is to indicate certain limitations as follows. As the distance of the ties 39 is increased from the center of the main span, points are reached where the cables such as 40 or 14 are substantially vertically spaced from the roadway, and if this spacing is very great then the resulting structure will be subject to torsional effects even though the cable clamps such as 42 should be directly cross-braced over the roadway. It is therefore preferred to locate the ties such as 21 and 39 at points where the cables are not so distant from the roadway as to diminish the rigidity of the connections or permit the creation of torsional effects.

I claim:

1. In a suspension bridge construction, spaced towers, a plurality of spaced apart cables supported by said towers, rigid frame sections suspended from said cables, brackets rigidly connecting said frame sections to said cables in the central region of the span to prevent relative lateral movement therebetween, and a roadway supported on said frame sections.

2. The suspension bridge construction defined in claim 1, in which the frame sections are spaced longitudinally in the central region of the span to provide a plurality of roadway sections, said sections being rigidly connected to said cables by means of said brackets.

3. The suspension bridge construction defined in claim 1, in which the roadway is split transversely at said central region providing a plurality of roadway sections, and hinge means interconnecting said frame sections whereby said sections are maintained in approximate longitudinal alinement to permit relative angular movement therebetween for avoiding transmission or moments of force from one section to another.

BENJAMIN GARFINKEL.

REFERENCES CITED

The following references are of record in the file of this patent:

UNITED STATES PATENTS

| Number | Name | Date |
|---|---|---|
| Re. 3,073 | Bender | Aug. 11, 1868 |
| 1,453,084 | Strauss | Apr. 24, 1923 |
| 1,626,241 | Krivoshein | Apr. 26, 1927 |
| 1,666,586 | Wait | Apr. 17, 1928 |
| 1,897,470 | Forssell | Feb. 14, 1933 |
| 2,192,269 | Maddock | Mar. 5, 1940 |
| 2,217,593 | London | Oct. 8, 1940 |

FOREIGN PATENTS

| Number | Country | Date |
|---|---|---|
| 290,223 | Great Britain | Dec. 20, 1928 |
| 306,234 | Great Britain | Feb. 21, 1929 |
| 718,661 | France | 1931 |

OTHER REFERENCES

Engineering News-Record, June 29, 1939, pages 4 and 5.